Jan. 30, 1968 C. G. KELSEY 3,366,934

DATA TRANSMISSION MEANS

Filed April 27, 1965 5 Sheets-Sheet 1

INVENTOR.
CHRISTOPHER G. KELSEY
BY Oldham & Oldham
ATTYS.

Jan. 30, 1968 C. G. KELSEY 3,366,934

DATA TRANSMISSION MEANS

Filed April 27, 1965 5 Sheets-Sheet 2

INVENTOR.
CHRISTOPHER G. KELSEY
BY Oldham & Oldham
ATTYS.

INVENTOR.
CHRISTOPHER G. KELSEY
BY Oldham & Oldham
ATTYS.

Jan. 30, 1968 C. G. KELSEY 3,366,934

DATA TRANSMISSION MEANS

Filed April 27, 1965 5 Sheets-Sheet 4

INVENTOR.
CHRISTOPHER G. KELSEY
BY
Oldham & Oldham
ATTYS.

INVENTOR.
CHRISTOPHER G KELSEY
BY Oldham & Oldham
ATTYS.

United States Patent Office 3,366,934

Patented Jan. 30, 1968

3,366,934

DATA TRANSMISSION MEANS

Christopher G. Kelsey, Glenalta, South Australia, Australia, assignor to Data Resolved Tools Pty. Ltd., Adelaide, South Australia, Australia Filed Apr. 27, 1965, Ser. No. 451,258
Claims priority, application Australia, Apr. 29, 1964, 43,895/64
7 Claims. (Cl. 340—172.5)

ABSTRACT OF THE DISCLOSURE

Data transmission means having input means with a tracer movable simultaneously in X, Y and Z directions and an output means having two print-out marker means, wherein the print-out marker means are movable over a plane surface simultaneously in one direction and separately in a direction at right angles thereto.

Figure 1:
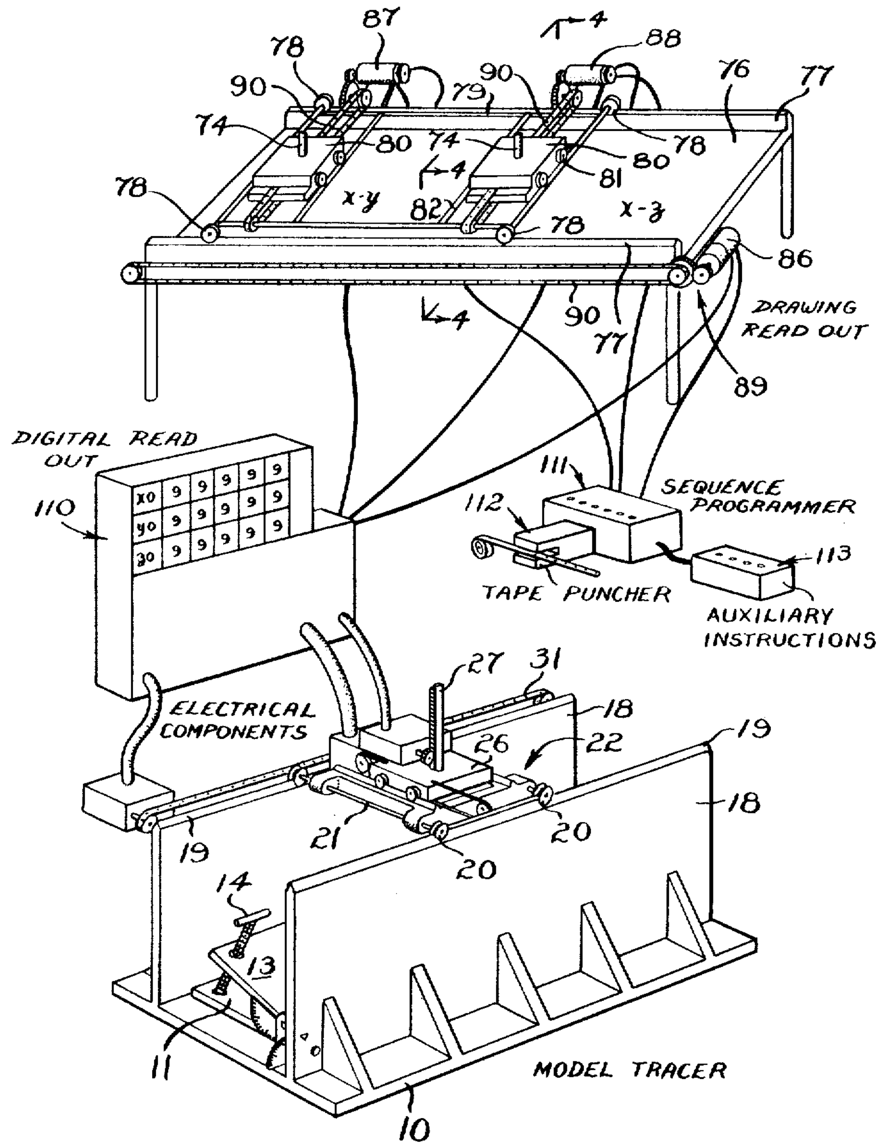

This invention relates to transmission means for transmitting data from a model to a punched tape or other information storage device.

It is already known to make use of a punched tape to record the co-ordinates of a drawing so that the shape of a model can be determined by the punchings on a tape, and this information can be direct fed into a machine for forming the model. However once a model has been formed there is no ready means of checking to see whether the formed model follows exactly the drawing from which it is made, and one of the objects of this invention is to provide a means whereby the shape of the model can be similarly translated to a punched tape or other information storage device which can be compared with the master to ensure the model is correct to the drawings.

A still further object of this invention is to provide a data transmission means which will transmit the points in space defining the surface of a model or the like in such a way that they can be related directly to a drawing or other plane surface, for example, a template.

It frequently occurs that a drawing which is used for the making of a model has its three axes set in space on planes, none of which correspond to the base plane of the model. Thus, for example, in the case of a fender die for an automobile, it is necessary for the fender to be "tipped" relative to the vertical and horizontal axes of the vehicle before the pressings can be effected. A further object of this invention is to provide means whereby the information transmitted can be "tipped" about axes so that it can be related direct to a master drawing, template or other master shape determining means and this object is achieved by coupling resolvers to a tracer, and coupling the output of the resolvers in an algebraic sum, the readout means being operable in response to the sum.

In many cases models are built before drawings are made, and a still further object of this invention is to provide a means whereby a drawing can be made from a model, and this object is achieved by utilizing servo driven readout means to drive a pencil or other marking device over a drawing.

When a small article is to be manufactured to high accuracy, it is frequently desirable to have a large model of the article so that its detail of shape can be accurately determined. A still further object of this invention is to provide means whereby a model may be accurately "scaled down," and this object is achieved by utilizing the invention to place accurate co-ordinate information onto a punched tape.

In its simple form this invention may be said to consist of data transmission means wherein a tracer is movable simultaneously in X, Y and Z directions with reference to a set of Cartesian co-ordinates and is mechanically coupled to three sets of electrical signal varying means, each responsive to tracer movement in a respective said direction, and servo driven readout means driven in response to variation of the electrical signal varying means upon corresponding tracer movement.

Figures 2, 3:
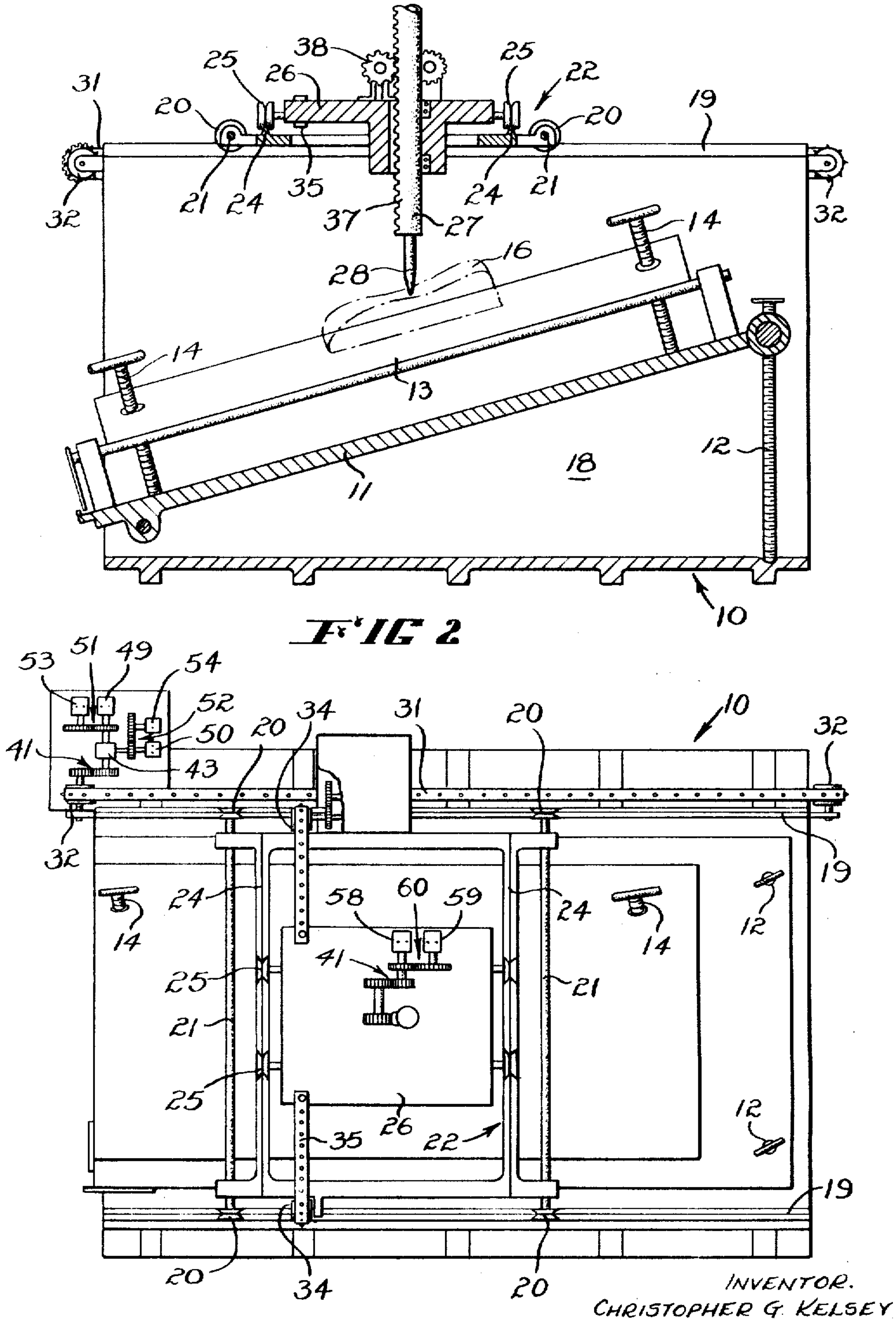
Figure 4:
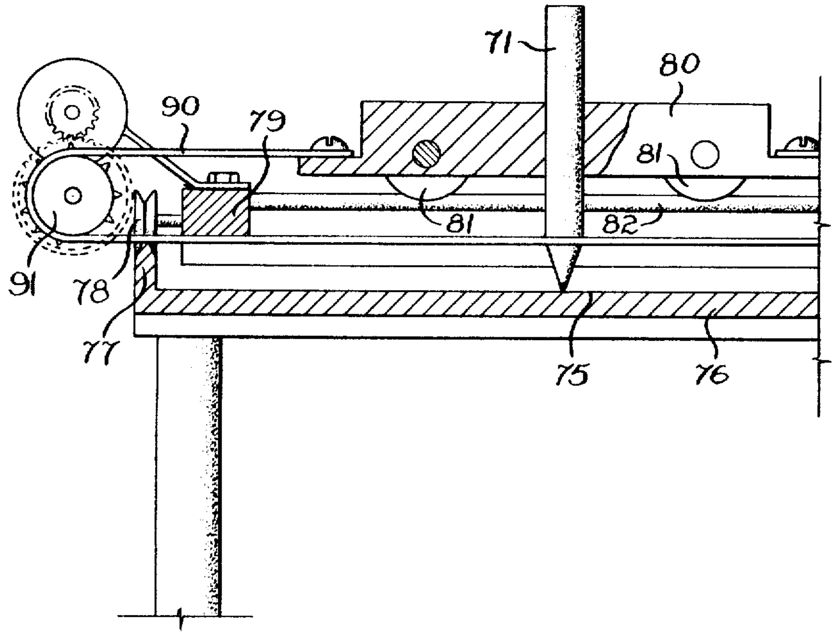
Figure 5:
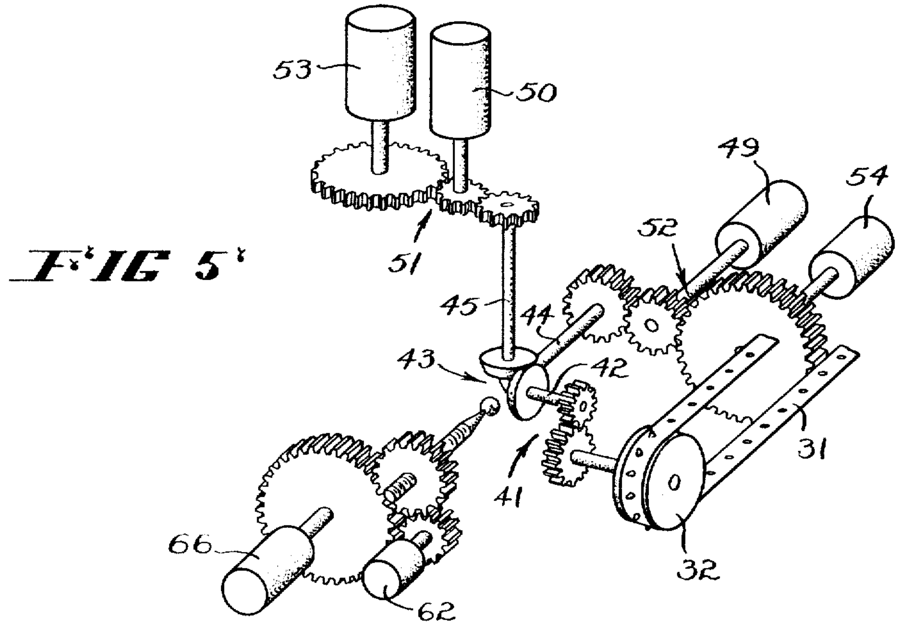
Figure 6:
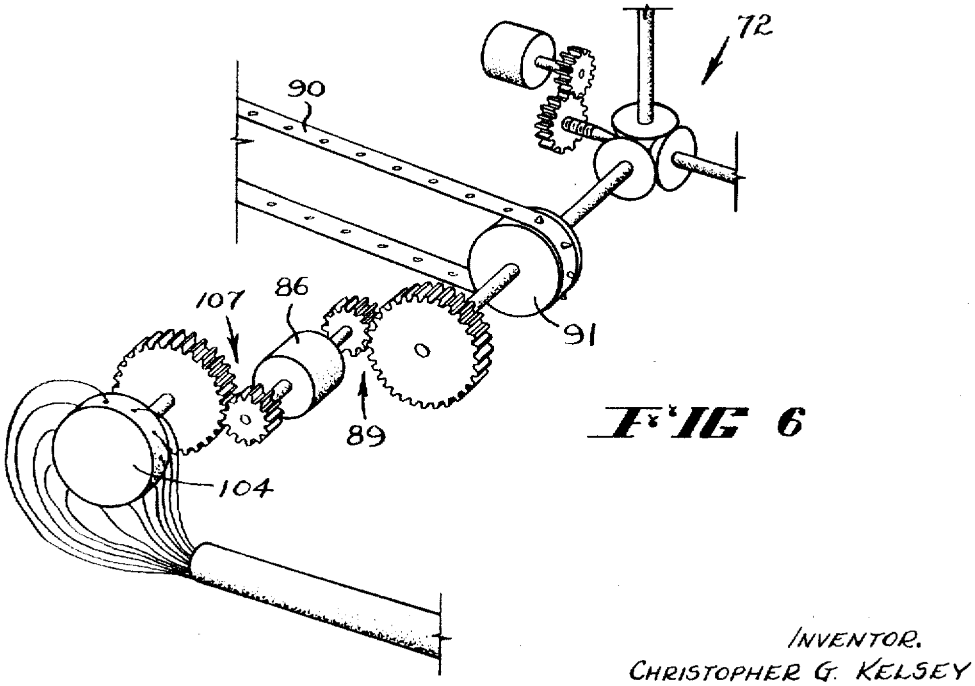
Figure 7:
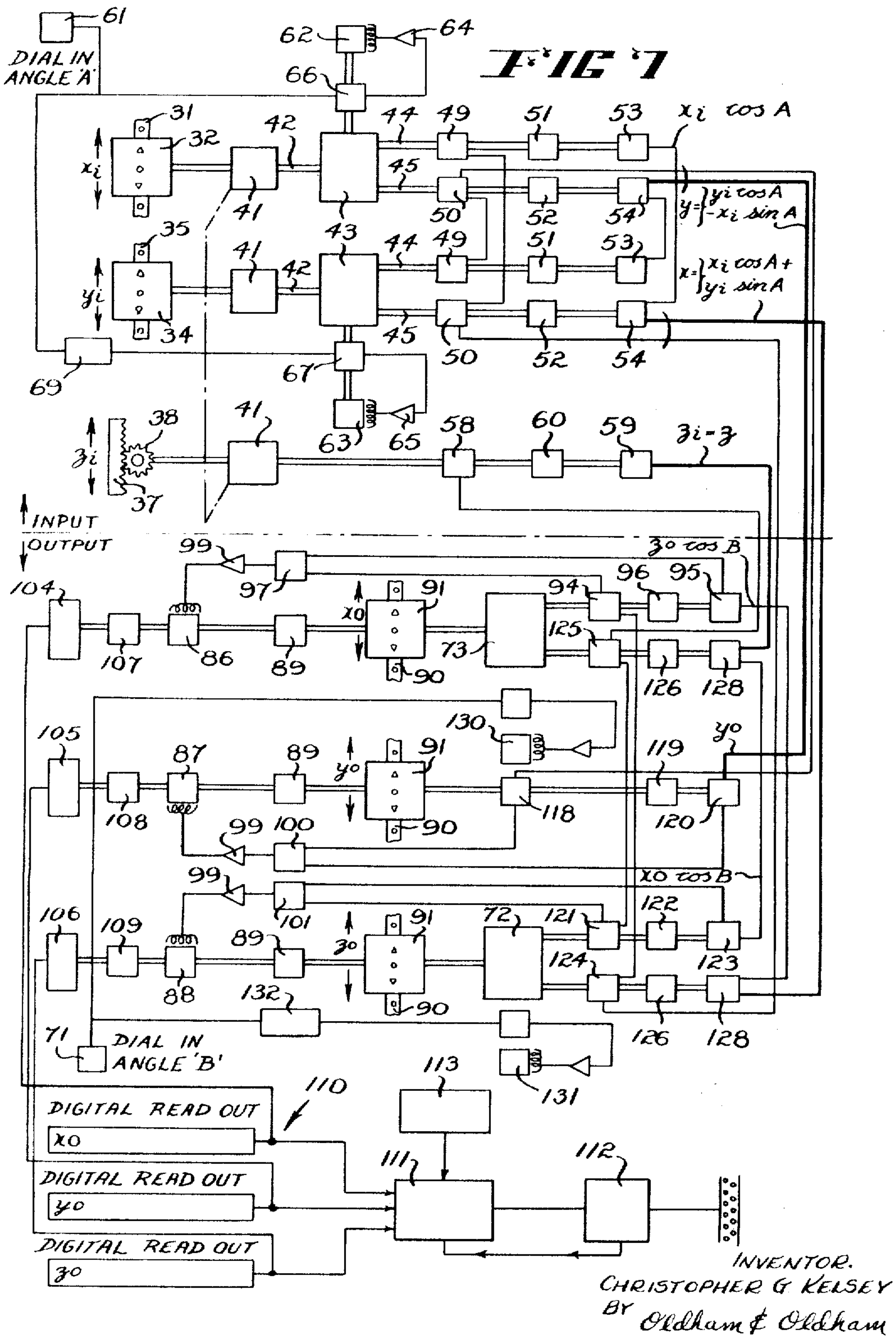

An embodiment of the invention is described hereunder in some detail with reference to and is illustrated in the accompanying drawings, in which:

FIG. 1 is a schematic layout of data transmission means according to this embodiment, FIG. 2 is a longitudinal section of the base and tracer device of the data transmission means, FIG. 3 is a plan view of same, FIG. 4 is a fragmentary section of a printout pencil on a carriage movable over a plane surface, taken on plane 4—4—4 of FIG. 1, FIG. 5 is an "exploded" fragmentary perspective view of one of the three sets of electrical signal varying means, showing the mechanical coupling thereto, FIG. 6 shows the servo driven readout means, and FIG. 7 shows, in block diagram form, the electrical circuit.

This embodiment is based, for the "tipping" of a drawing, on the mathematics of the vectorial addition of corresponding lines on two views of a drawing, which reduces to the expression "$\pm y_i \cos A \mp x_1 \text{ sine } A$" where A is the angle of deviation from the true third view. Where a view is rotated about the angle A in one plane and the angle B in a plane at right-angles thereto ("Z" plane), a compound rotation about an intermediate axis takes place according to the second formula $$z_0 \text{ sine } D \mp (\pm x_1 \text{ sine } A \mp y_1 \cos A) \cos B.$$

These expressions are derived by considering the abscissa and ordinate of the projection of a point, with the plan view passing through the origin of the abscissa and ordinate, and the angle of deviation being reckoned between the plane view and the ordinate. The disposition of the signs for the trigonometrical functions will of course be determined by the quadrant in which the plan view lies.

An alternative and useful way of expressing the above is in the following three families of equations:

$$x = x_1 \cos A + y_1 \text{ sine } A;\ x_o = x \cos B + z \text{ sine } B;$$
$$x = x_o \cos B - z_o \text{ sine } B$$
$$y = -x_1 \text{ sine } A + y_1 \cos A;\ y_o = y;\ y = y_o$$
$$z = z_1;\ z_o = -x \text{ sine } B + z \cos B;\ z = x_o \text{ sine } B + z_o \cos B$$

The suffix $i$ is intended to relate to the input signal while the suffix $o$ is intended to realteo to the output signal.

In this embodiment a base 10 is arranged with a first tiltable table 11 (tilted by jack screws 12) and a second tiltable table 13 (raised by jack screws 14), the table 13 being arranged to carry on it a model 16, and the base has two upstanding sides 18 which terminate in upstanding rails 19 which are engaged by rollers 20 which are rotatable on axles 21 carried on a longitudinal carriage 22. The longitudinal carriage 22 itself has a pair of spaced transversely extending tracks 24, and these are engaged by rollers 25 on a transversely movable carriage 26. The transversely movable carriage 26 itself carries a tracer support 27 which is vertically movable therein, the tracer support 27 terminating at its lower end in a tracer 28.

A band 31 of flexible perforated steel is secured at its ends to the carriage 22 and passes over sprockets 32 which accurately respond rotationally to longitudinal tracer movement. Similarly sprockets 34 are driven by a band 35 secured at its ends to the transversely movable carriage 26. In the case of the vertical tracer movement however, an accurately machined rack 37 engages a pinion 38 (preferably with spring teeth) to thereby drive the pinion 38 upon vertical movement of the tracer 28. This constitutes the "$z_1$" input.

The physical arrangement of the synchros driven by the respective sprockets 32 or 34, is best seen by reference to the exploded view of FIG. 5, which illustrates the synchros driven by a sprocket 32, the arrangement for the sprocket 34 however being similar.

The sprocket 32 (or 34) drives into a variable ratio gearbox 41, so that by setting the same ratio in each box a drawing (or three dimensional part) change scale is effected. The output shafts 42 of the gearboxes 41 are each coupled to a ball resolver 43 which has two output shafts 44 and 45, one rotating through the angle equal to the input angular rotation multiplied by the cosine of the quantity set into the resolver, and the other equal to the input angular rotation multiplied by the sine thereof. In this embodiment it may be considered that the input into sprocket 32 is $x_1$, then rotation of shaft 44 is $x_1 \cos A$ and rotation of shaft 45 is $x_1$ sine $A$, A being the angle of "tip" fed into the resolver 43. Similarly if $y_1$ is the input into sprocket 34, the outputs are $y_1 \cos A$ and $y_1$ sine $A$.

Driven by shafts 44 and 45 are differential synchros 49 and 50 respectively, and these drive through respective synchro gearboxes 51 and 52 the further synchros 53 and 54, thus providing a "fine and coarse" signal system for the electrical signal varying means, the signals of which are added to give an output $y=y_1 \cos A-z_1$ sine $A$ and $x=x_1 \cos A+y_1$ sine $A$ (FIG. 7).

A somewhat different arrangement exists on the vertically movable tracer wherein the synchros 58 and 59 are direct driven through a gearbox 41 upon vertical movement of the tracer 28, the synchros again being interconnected by a gearbox 60 to provide the "fine and coarse" system. If tracer movement is deemed to be in the $X_1-O-X$ direction, then the output of these synchros is equal to the input (or a scale thereof), thus $x_1=x$.

A set up synchro 61 controls a pair of set up motors 62 and 63 through respective amplifiers 64 and 65, the loop synchros 66 and 67 forming portion of servo loops. The synchro 61 has the function of determining the first angle of "tip" A, and is associated with graduative means (not shown) to provide a ready identification of the angle which is to be "tipped." The setup motor 62 is coupled to one of the resolvers 43 through the loop synchro 66. The other resolver 43 is similarly driven but by the other setup motor 63. The differential synchro 69 allows the setting of the second resolver 43 to be varied slightly in order that accuracy may be improved.

In a similar fashion synchro 71 sets up resolvers 72 and 73 (FIG. 7) and determines the second angle of "tip" B.

By utilizing the above described "fine" and "coarse" system, the $x$, $y$ and $z$ quantities may be retained within one revolution only of the "coarse" synchros (53, 54 and 59) for all translational tracer movement. Thus when the operator of the machine moves the tracer with combined movements of the tracer support, transversely movable carriage and longitudinally movable carriage, the instantaneous co-ordinates of a point $x_1$, $y_1$ or $z_1$ are transformed into fine and coarse electrical signals $x$, $y$ and $z$ corresponding to a tip through an angle A about axis $IX_1-O-IX$.

FIG. 4 illustrates a fragmentary section of a readout pencil 74 moving over the plane surface 75 of a table 76. The table 76 has a pair of longitudinal rails 77 engaged by rollers 78 on a longitudinal printout carriage 79, the longitudinal printout carriage 79 having a pair of independently driven transverse printout carriages 80 on rollers 81 engaging rails 82 on the carriage 79. The longitudinal carriage is driven, say, by the "$x_0$" output servo motor 86, while the transverse carriages are driven by the "$y_0$" and "$z_0$" output servo motors 87 and 88 respectively. In each case the drive is through a gearbox 89 and transmitted by a perforated band 90 engaging sprockets 91 (as in the case of the $y_1$ and $x_1$ inputs). In a similar manner to those on the input, the bands 90 are connected through sprockets 91, resolvers and synchros to produce the quantities ($x_0 \cos B-Z_0$ sine $B$), $y_0$ and ($x_0$ sine $B+Z_0 \cos B$) represented by electrical voltages in fine and coarse channels.

When the output system is in its correct position there will be no difference between these quantities and the quantities $x$, $y$ and $z$. Accordingly, the fine input channel is electrically connected to the fine output channel and the coarse input channel is electrically connected to the coarse output channel. If there is a different in, say $z$, this causes voltages to appear on the outputs of synchros 94 and 95 which are coupled together by the gearbox 96. These voltages are supplied to selector switch 97 (or similar device) which compares the amplitude of the coarse error voltage, which is the output of synchro 95, with a reference voltage and connects the coarse error voltage to amplifier 99 if the error voltage is greater than the reference. Otherwise the switch 97 connects the fine error voltage, which is the output of synchro 94, to the amplifier 99. Similar operations occur in the other two sector switches 100 and 101. The output of the three amplifiers 99 are fed respectively to motors 86, 87 and 88 which through their respective gearboxes 89 drive the respective sprockets 91 in such a direction as to cause the voltages to become zero, at which point the output sprockets have assumed their correct position in respect of the input sprockets 32 and 34 and the pinion 38.

Mechanically coupled to respective output sprockets 91 are encoders 104, 105 and 106 through gearboxes 107, 108 and 109 respectively. The outputs from these encoders are "feed" to a visual readout designated 110 so that at any instant the dimension can be determined, while the output also enters a sequence programmer 111. In this embodiment the sequence programmer is of the type which includes a series of indexing switches which are operated by relays to put in order the sequence of tape punching signals from $x_0$, $y_0$ and $z_0$ readout. This can of course vary according to the format of tape used.

The output of the sequence programmer feeds into a tape puncher 112, but this feeds back into the sequence programmer to control the order of punching. The auxiliary instructions 113 are in accordance with the usual practice for giving instructions such as parabolic stop or start to the tape punching device.

Many portions of the circuit shown in FIG. 7 are simply repetitive, and the following schedule sets out equivalent elements of circuit parts:

Synchro 118 is equivalent to synchro 58
Gearbox 119 is equivalent to gearbox 60
Synchro 120 is equivalent to synchro 59
Synchro 121 is equivalent to synchro 94
Gearbox 122 is equivalent to gearbox 96
Synchro 123 is equivalent to synchro 95
Differential synchro 124 is equivalent to differential synchro 50
Differential synchro 125 is equivalent to differential synchro 50

Gear boxes 126 is equivalent to gearboxes 52
Differential synchros 128 is equivalent to synchro 54
Setup motor 130 is equivalent to setup motor 62
Setup motor 131 is equivalent to setup motor 63
Differential synchro 132 is equivalent to differential synchro 69

It may be noted that the synchro 132 constitutes realignment adjustment means.

While one complete embodiment of the invention has been disclosed herein, it will be appreciated that modification of this particular embodiment of the invention may be resorted to without departing from he scope of the invention as defined in the appended claims.

What I claim is:

1. Data transmission means having input means wherein a tracer movable simultaneously in X, Y and Z directions is mechanically coupled to three sets of electrical signal varying means each responsive to tracer movement in a respective said direction and further having output means, the output means comprising: a plane surface, two print-out marker means movable over the plane surface simultaneously in one direction by a first servo motor and separately in a direction at right angles thereto by a second and third servo motor respectively.

2. Data transmission means according to claim 1 wherein the input means further comprises:

first guide means guiding the tracer for input movement in the Z direction, second guide means guiding said first guide means for input movement in the Y direction, and third guide means guiding said second guide means for input movement in the X direction.

3. Data transmission means according to claim 2 wherein the input means further comprises:

a base fixed relative to said third guide means, first tilting means tiltably carried by said base and locking means therebetween, second tilting means tiltably carried by said first tilting means and further locking means therebetween arranged so that a model when secured to said second tilting means is angularly adjustable relative to the base.

4. Data transmission means according to claim 2 wherein said signal varying means are constituted by synchros, coupling means between said synchros and said servo motors, said coupling means including a first resolver operatively coupled between the first and second guide means and a second resolver operatively coupled between the second and third guide means, and means coupling the outputs of the resolvers in algebraic sums lying within the following families of equations:

$$Z=Z_1 \cos A+Y_1 \sin A;\ Z_0=Z \cos B+X \sin B;\ Z=Z_0 \cos B-X_0 \sin B$$

$$Y=Z_1 \sin A+Y_1 \cos A;\ Y_0=Y;\ Y=Y_0$$

$$X=X_1;\ X_0=-Z \sin B+X \cos B;\ X=Z_0 \sin B+X_0 \cos B$$

$Z_1$, $Y_1$ and $X_1$ being respective input movements of said tracer,

Z, Y and X being said algebraic sums, $Z_0$, $Y_0$ and $X_0$ being output controlling respective servo motors of said servo driven print-out means.

A being an angle of tip about one of said Cartesian co-ordinates, and B being an angle of tip about another of said Cartesian co-ordinates.

5. Data transmission means wherein a tracer is movable simultaneously in X, Y and Z directions with reference to a set of Cartesian co-ordinates and is mechanically coupled to three sets of electrical signal varying means, each responsive to tracer movement in a respective said direction, and servo driven readout means driven in response to variation of the electrical signal varying means upon corresponding tracer movement, the tracer is guided for movement in first guide means in the Z direction, the first guide means being guided for movement in second guide means in a Y direction, and the second guide means being guided for movement in third guide means in an X direction, the third guide means being fixed on a base, the first of said three sets of electrical signal varying means including at least one synchro mechanically coupled to the tracer and first guide means to change its electrical characteristics upon relative movement therebetween, the second of said three sets including at least one synchro mechanically coupled to the first guide means and second guide means to change its electrical characteristics upon relative movement therebetween, and the third of said three sets including at least one synchro mechanically coupled to the second guide means and third guide means to change its electrical characteristics upon relative movement therebetween, the servo driven readout means being constituted by at least three servo motors for the X, Y and Z output, respectively, each driving an encoder, and the servo motors drive each of two printout marker means over a plane surface simultaneously in one direction and and separately in a direction at right angles thereto.

6. Data transmission means comprising:

a tracer, first guide means guiding the tracer for input movement in the Z direction of a system of Cartesian co-ordinates, second guide means guiding said first guide means for input movement in the Y direction of said system, third guide means guiding said second guide means for input movement in the X direction of said system, a base fixed relative to said third guide means, a first resolver operatively coupled between the first and second guide means and a second resolver operatively coupled between the second and third guide means, a synchro operatively coupled mechanically between the tracer and first guide means, synchros mechanically coupled to the output shafts of the resolvers, means coupling the output of the synchros in algebraic sums, servo driven printout means having a first servo motor responsive to the X output, a second servo motor responsive to the Y output and a third servo motor responsive to the Z output, first tilting means tiltably carried by said base, second tilting means tiltably carried by said first tilting means, locking means between said first tilting means and base, and further locking means between said first and second tilting means arranged so that a model when secured to said second tilting means is angularly adjustable relative to the base.

7. Data transmission means comprising:

a tracer, a transversely movable carriage having vertical guide means therein, said tracer being guided by said guide means for vertical movement therein, at least one synchro on the transversely movable carriage, drive means coupling said synchro or synchros to said tracer to be responsive to vertical tracer movement, and support means supporting the transversely movable carriage, a longitudinally movable carriage, transversely disposed tracks on the longitudinally movable carriage engaged by the support means of and guiding the transversely movable carriage, second drive means mechanically linking said carriages, at least one synchro coupled to said second drive means to thereby be responsive to transverse movement of the transversely movable carriage and in turn to be responsive to transverse tracer movement, and further support means supporting the longitudinally movable carriage, a base, longitudinally disposed tracks on the base engaged by said further support means of and guiding the longitudinally movable carriage, third drive means mechanically linking said base and longitudinally movabe carriage, at least one synchro coupled to said third drive means to thereby be responsive to longitudinal movement of the longitudinally movable carriage and in turn be responsive to longitudinal carriage movement, a plurality of servo motors driven in response to electrical signals controlled by said synchros readout means, further drive means coupling said readout means to said servo motors, and speed reduction means in said couplings of at least some of said drive means constituting scale change means.

References Cited

UNITED STATES PATENTS

| | | | |
|---|---|---|---|
| 2,861,234 | 11/1958 | Martin et al. | 346—33 |
| 2,916,342 | 12/1959 | De Neergaard | 346—33 |
| 3,032,881 | 5/1962 | Fengler | 346—33 |

ROBERT C. BAILEY, *Primary Examiner.*

G. D. SHAW, *Assistant Examiner.*